United States Patent Office 3,267,158
Patented August 16, 1966

3,267,158
OXIDATION OF NITROSO COMPOUNDS TO NITRO COMPOUNDS WITH OZONE
Anton J. Havlik, La Crescenta, Calif., assignor to Aerojet-General Corporation, Azusa, Calif., a corporation of Ohio
No Drawing. Filed July 10, 1964, Ser. No. 382,989
11 Claims. (Cl. 260—644)

This invention relates to a novel method of introducing a nitro group into organic compounds.

Heretofore, one method used for the preparation of nitro compounds involved converting a mononitro compound to its aci-salt with an alkali metal hydroxide such as sodium or potassium hydroxide. This is then allowed to form a complex with sodium nitrite. To this complex is then added a solution of silver nitrate, and the resultant product is isolated from the reaction mixture after removal of the precipitated metallic silver. The yields of product, however, fall off rapidly as the scale of this reaction is increased. This is due to the physical limitations that govern the rate at which the silver nitrate can be added.

Previously, other efforts also have been made to introduce nitro groups into aliphatic organic compounds by oxidation. These prior processes have usually resulted in a product which was contaminated with undesirable by-products, particularly when it was attempted to apply the process to large scale production. Further, the process of the prior art involving the production of nitro containing organic compounds by oxidation usually resulted in a certain amount of destruction of the nitro group in situ.

I have now found quite surprisingly that the ozone oxidation of aliphatic nitroso compounds permits the preparation of the highly desirable nitro-containing compounds of the aliphatic series in excellent yield by an economical and convenient procedure. My new process is well adapted to the large scale production of nitro compounds.

Therefore, it is an object of this invention to make available economically the aliphatic nitro compounds from aliphatic nitroso compounds. Another object of this invention is to accomplish this oxidation reaction without the destruction of the nitro group as it is formed. Still another object of this invention is to provide a process for the production of nitro compounds which dispenses with the need for the use of costly silver. These and other objects of my invention will become apparent from the detailed description which follows.

The process which I have discovered involves the following general reaction:

(I) 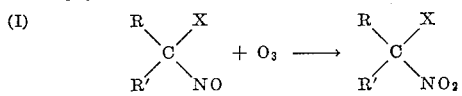

wherein X is selected from the group consisting of nitro and chloro, R and R' are alkyl, with the proviso that R and R' may be joined to form a cycloalkyl group containing from 3 to 6 carbon atoms. In the above equation, R and R' may contain from 1 to about 6 carbon atoms such as methyl, ethyl, propyl, isopropyl, butyl, tertiary butyl, neopentyl, hexyl and other similar lower alkyl groups. Typical cycloalkyl groups in the foregoing equation include cyclopropyl, cyclobutyl, cyclopentyl and cyclohexyl.

The above reaction may be carried out over a wide range of temperatures. Normally the reaction is carried out at a temperature of from about 0° C. to about 75° C. More preferably, the reaction is carried out at a temperature from about 10° C. to about 30° C. In the reaction, the precise amount of ozone used is not critical. In general, best results are obtained when the amount of ozone added is about stoichiometrically equivalent to the amount of nitroso compound present. The foregoing reaction is preferably, although not necessarily, carried out in the presence of a substantially inert solvent such as glacial acetic acid, trichloroacetic acid, trifluoroacetic acid or carbon tetrachloride. From about 5 to about 50 parts by weight of the solvent are used per part of the nitroso compound being treated.

The above described reaction is ordinarily carried out at atmospheric pressure since this procedure is normally most convenient and results in good yields. However, pressure is not critical and it is envisioned that the reaction may be carried out over a wide range of pressures from about 0.1 to about 100 atmospheres. The nitro compounds produced according to this process may be isolated from the reaction mixture and purified in conventional manner such as by distillation, extraction, crystallization and/or evaporation.

In general, the ozone employed in the above reaction may be prepared as needed from oxygen in an ozonizer apparatus containing an electric discharge tube. This procedure for the generation of ozone is described further in Smith, Greenwood and Hurdlick, "Organic Synthesis," coll. vol. 3, John Wiley and Sons, Inc., New York, New York (1955), page 673. In general, this method of producing ozone from oxygen is well-known to those skilled in the art and will not be further discussed. However, it should be noted that since the ozone is produced from oxygen, ordinarily some oxygen is present in the ozone stream which is contacted with the nitroso compound undergoing conversion.

In the process of my invention, when X is nitro, the starting materials have the formula:

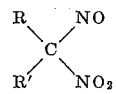

wherein R and R' are as previously defined. These compounds are commonly referred to as pseudo-nitroles and are prepared by the reaction of an alkali metal nitrite with the nitroparaffin in the presence of strong acid, as shown in the following equation:

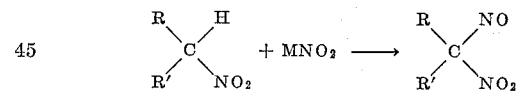

wherein M is an alkali metal. In the reaction, the nitroparaffin is first sometimes converted to the corresponding salt by treatment with a strong base. The preparation of the psuedonitroles is further described in Brewster, "Organic Chemistry," Second Edition, Prentice-Hall, Inc., New York, New York (1953), pages 292 and 293.

In Table I below there appears some of the psuedo-nitroles and dinitroparaffins obtainable therefrom by the practice of the process of my invention.

TABLE I

| Psuedo-nitrole | Dinitroparaffin |
| --- | --- |
| 2-nitroso-2-nitro-propane | 2,2-dinitropropane. |
| 2-nitroso-2-nitro-butane | 2,2-dinitrobutane. |
| 4-nitroso-4-nitro-heptane | 4,4-dinitroheptane. |
| 1-nitroso-1-nitro-cyclopropane | 1,1-dinitrocyclopropane. |
| 1-nitroso-1-nitro-cyclohexane | 1,1-dinitrocyclohexane. |

In Reaction I, when X is chloro, the starting materials have the formula:

wherein R and R' are in accordance with the definition set forth above. These chloro-nitrosoalkanes are prepared by the reaction of the corresponding ketoxime with chlorine gas in the presence of sodium acetate as shown in the following equation:

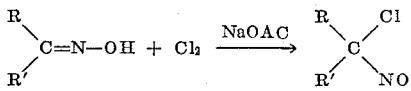

In the following Table II are set forth typical chloro-nitrosoalkanes and the chloro-nitroalkanes obtained from them in accordance with the process of the present invention.

TABLE II

| Chloro-nitrosoalkanes | Chloro-nitroalkanes |
|---|---|
| 2-chloro-2-nitrosopropane | 2-chloro-2-nitropropane. |
| 2-chloro-2-nitrosodecane | 2-chloro-2-nitrodecane. |
| 1-chloro-1-nitrosocyclopentane | 1-chloro-1-nitrocyclopentane. |
| 1-chloro-1-nitrosocyclobutane | 1-chloro-1-nitrocyclobutane. |

The following examples are presented solely for the purpose of illustration and should not be regarded as limiting the invention in any way. In the examples, the parts and percentages are by weight unless otherwise indicated.

*Example I.—Preparation of 2-chloro-2-nitropropane*

Into a three-nicked, one-liter flask fitted with a motor-driven stirrer and gas inlet tube were placed 281 ml. of water, 44.5 grams (0.610 mole) of dimethyl ketoxime and 174 grams of sodium acetate trihydrate. With constant stirring and cooling chlorine gas was added over a period of 23 minutes, at such a rate that the temperature of the mixture was kept below 0° C. After standing for 20 minutes, the dark blue oil was collected and washed with two 100 ml. portions of ice-water. The wet, crude product (30 grams; 46 percent) was dried over 30 grams of sodium sulfate and stored in the refrigerator for future use. Chlorine passage through the reaction mixture for another 15 minutes led to the isolation of an additional 2.0 grams of product. 4.20 grams (0.0390 mole) of crude 2-chloro-2-nitrosopropane dissolved in 150 ml. of acetic acid was treated with a mixture of oxygen and ozone (1.67 grams, 0.045 mole) for one hour at 21° C. to give 1.51 grams (31 percent) of crude 2-chloro-2-nitropropane. The infrared spectrum of the crude material [3.55 (w), 6.40 (v.s.), 6.90 (m), 7.20 (m), 7.30 (m), 7.55 (s), 8.20 (w), 8.55 (m), 8.90 (m), 10.80 (m), 11.80 (s)] was consistent with that reported for 2-chloro-2-nitropropane.

*Example II.—Preparation of 2-chloro-2-nitropropane*

By a procedure similar to that described above, 11.4 grams (0.0107 mole) of crude 2-chloro-2-nitrosopropane dissolved in 150 ml. of acetic acid was treated with a mixture of oxygen and ozone (5.00 grams, 0.105 mole) for three hours at 14° C. to give 6.8 grams (58 percent) of crude 2-chloro-2-nitropropane. The refractive index of the crude material was $n_D^{25}$ 1.4252. The crude material was purified by distillation through a Holzman column to give 4.9 grams of liquid (B.P. 57 to 58° C., 51 mm.; $n_D^{25}$ 1.4246).

*Example III.—Preparation of 2-chloro-2-nitropentane*

By a procedure similar to that described above, 0.010 mole of crude 2-chloro-2-nitrosopentane dissolved in 150 ml. of acetic acid is treated with a mixture of oxygen and ozone 0.10 mole for three hours at about 14° C. to give about 6.0 grams of crude 2-chloro-2-nitropentane. The crude material is purified by distillation through a Holzman column to give about 4.0 grams of 2-chloro-2-nitropentane.

*Example IV.—Preparation of 1,1-dinitrocyclohexane*

To 65 grams (0.50 mole) of redistilled nitrocyclohexane ($n_D^{24}$ 1.4598), which was dissolved in a mixture of 135 ml. of methanol and provided with a stirrer, dropping funnel and thermometer, there was added a solution of sodium hydroxide (24 grams: 0.50 mole) in 100 ml. of water. This mixture was added with the temperature maintained from 7 to 10° C. While the components of the mixture were being added, 50 ml. of water was added to keep the system homogeneous. The solution of the sodium salt of nitrocyclohexane was added to 100 ml. of water in a 2-liter, round bottomed flask, which was equipped similar to the 250-ml. flask. A solution of 40 grams of sodium nitrite, which was dissolved in 100 ml. of water, was added and the solution was cooled to −4° C. with a Dry Ice-acetone cooling bath. To the vigorously stirred solution, there was added a dilute solution of sulfuric acid (32 ml. conc. $H_2SO_4$: 97 ml. of water). The temperature was maintained between −5 and 0° C. while the acid was being added. The addition of the acid required about 40 minutes. The blue-colored solid was collected by filtration and washed with three 300-ml. portions of water. A further washing, with about 50 ml. of hexane, transformed the putty-type solid into a blue, powdery one (42 grams; 53 percent), M.P. (with dec.) at 69 to 73° C. To 26.9 grams (0.170 mole) of cyclohexyl pseudonitrole suspended in 150 ml. of acetic acid was added a mixture of oxygen and ozone for 7.5 hours at 18 to 22° C. The ozonizer produced 0.26 mole of ozone during this period of time. During the run, the ozone-oxygen gas flow was occasionally stopped and more of the pseudonitrole brought into solution by stirring of the acetic acid mixture. The reaction mixture became colorless and homogeneous after the 7.5 hour period. Dilution of the acetic acid solution with 100 ml. of water and neutralization with an aqueous solution of sodium hydroxide (107 grams) in 400 ml. of water followed by extraction of the neutralized solution with five 100-ml. portions of methylene chloride let, by subsequent concentration, to 24.7 grams (84 percent; $n_D^{22}$ 1.4726) of 1,1-dinitrocyclohexane (lit., $n_D^{20}$ 1.4740). The liquid was fractionally distilled through a Holzman column to give two fractions: I, 1.5 grams (B.P. 77 to 89°/4 mm.) and II, 13.0 grams (B.P. 88 to 92°/4 mm.). A sample of 1,1-dinitrocyclohexane with a melting point of 31 to 33° C. was submitted for analyses.

*Analysis.*—Calc'd for $C_6H_{10}N_2O_4$: C, 41.37; H, 5.79; N, 16.09. Found: C, 41.33; H, 5.76; N, 15.55.

*Example V.—Preparation of 1,1-dinitrocyclopentane*

To 0.50 mole of redistilled nitrocyclopentane which is dissolved in a mixture of about 135 ml. of methanol and provided with a stirrer, dropping funnel, and thermometer there is added a solution of sodium hydroxide (0.50 mole) in 100 ml. of water. This mixture is added with the temperature maintained at about 10° C. While the components of the mixture are being added, 50 ml. of water is added to keep the system homogeneous. The solution of the sodium salt of nitrocyclopentane is added to 100 ml. of water in a flask. A solution of 40 grams of sodium nitrite, which is dissolved in 100 ml. of water, is added and the solution is cooled to about −4° C. with a Dry Ice-acetone cooling bath. To the vigorously stirred solution, there is lowly added a dilute solution of sulfuric acid (32 ml. conc. $H_2SO_4$: 97 ml. water). The temperature is maintained between −5 and 0° C. while the acid is being added. The addition of the acid requires about 40 minutes. The solid is collected by filtration and washed with water. A further washing, with about 50 ml. of hexane, provides a good yield of product. Then, 0.170 mole of the cyclopentyl pseudonitrole thus obtained is suspended in 150 ml. of acetic acid. There is added a mixture of oxygen and ozone for 7 to 8 hours at 18 to 22° C. During the run, the ozone-oxygen gas flow is occassionally stopped and more of the pseudonitrole brought into solution by stirring of the acetic acid mixture. After the 7 to 8 hour period, the acetic acid solution is diluted with 100 ml. of water and neutralized with an aqueous solution of sodium hydroxide (107 grams) in 400 ml. of water. This is followed by extraction of the neutralized solution with five 100-ml. portions of methylene chloride. After concentration, about 20 grams of 1,1-dinitrocyclopentane is obtained.

*Example VI.—Preparation of 2,2-dinitropropane*

To 49.5 grams (0.55 mole) of 2-nitropropane in a three-necked 2-liter flask fitted with a motor-driven stirrer and separatory funnel was added dropwise, with cooling and stirring, a saturated solution of sodium hydroxide (21.0 grams: 0.51 mole) in 1070 ml. of ethanol. The addition required about three hours and the temperature was maintained at about 5° C., by an ice-bath. After the reaction mixture was stirred for an additional hour, 2000 ml. of ethyl ether were added and the precipitated sodium 2-nitropropane collected and washed with two 50-ml. portions of ethyl ether. The air-dried salt weighed 52.0 grams (92 percent). To 48.0 grams (0.80 mole) of acetic acid in a three-necked flask fitted with a motor-driven stirrer and separatory funnel was added dropwise, with cooling and stirring, a previously prepared solution of sodium nitrite (28 grams; 0.40 mole) and sodium 2-nitropropane (44 grams; 0.40 mole) in 1250 ml. of water. The addition required two and one-half hours and the temperature was maintained between 5 and 8° C. The precipitate was collected, washed with three 100-ml. portions of water and air-dried at ambient temperatures for twelve hours. The dried 2 - nitroso - 2 - nitropropane weighed 22.6 grams (49 percent) and melted with decomposition at 82 to 83° C.

*Analysis.*—Calc'd for $C_3H_6N_2O_3$: C, 30.51; H, 5.12; N, 23.72. Found: C, 30.53; H, 5.25; N, 22.81.

To 4.65 grams of 2-nitroso-2-nitropropane suspended in 150 ml. of glacial acetic acid was added a mixture of oxygen and ozone. At the end of 66 minutes, about 0.04 mole of ozone had been added. The ozonized product was purified as follows. To 3.0 grams of product (M.P. 49 to 53°) in 150 ml. of glacial acetic acid was added 100 ml. of water and the resulting solution cooled to about —5° C. A solution of 107 grams of sodium hydroxide in 400 ml. of water was added with stirring and the temperature maintained at about —5° C. The neutralized solution was extracted with three 100-ml. portions of methylene chloride and the extract dried over sodium sulfate. Evaporation of the methylene chloride gave 2.6 grams (88 percent recovery) of 2,2-dinitropropane (M.P. 49 to 52° C.)

*Example VII.—Preparation of 4,4-dinitroheptane*

To 0.50 mole of 4-nitroheptane in a flask fitted with a motor-driven stirrer and separatory funnel is added dropwise, with cooling and stirring, a saturated solution of sodium hydroxide (0.50 mole) in ethanol. The addition requires about three hours and the temperature is maintained at about 15° C. After the reaction mixture is stirred for an additional hour, ethyl ether is added and the precipitated sodium 4-nitroheptane collected and washed with two 50-ml. portions of ethyl ether. The salt is air dried. To about 0.80 mole of acetic acid in a flask fitted with a motor-driven stirrer and separatory funnel is added dropwise, with cooling and stirring, a previously prepared solution of sodium nitrite 0.40 mole and sodium 4-nitroheptane (0.40 mole) in water. The addition requires about three hours and the temperature is maintained at around 10° C. The precipitate is collected, washed with water and air-dried at ambient temperatures for about twelve hours. The dried 4-nitroso-4-nitroheptane obtained is then reacted with ozone as follows. To 0.04 mole of 4-nitroso-4-nitroheptane suspended in glacial acetic acid is added a mixture of oxygen and ozone. At the end of about two hours, about 0.04 mole of ozone has been added. The ozonized product is purified with water and a methylene chloride, and dried over sodium sulfate. A good yield of 4,4-dinitroheptane is obtained.

The nitro compounds produced by the novel process of this invention are inherently useful as exposives. In addition, these compounds have many other uses known to those skilled in the art. For example, these compounds can be used in fuel compositions, as solvents, and as intermediates in the preparation of many other valuable compounds.

Having fully described my invention, it is intended that it be limited only by the lawful scope of the appended claims.

I claim:
1. The method of producing nitro compounds of the formula:

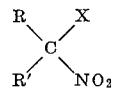

which comprises contacting ozone with a nitroso compound of the formula:

wherein in the above formulae, X is selected from the group consisting of nitro and chloro, R and R' are alkyl, with the proviso that R and R' may join to form a cycloalkyl group containing from 3 to 6 carbon atoms.

2. The method of producing nitro compounds of the formula:

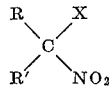

which comprises contacting ozone with a nitroso compound of the formula:

in the presence of a substantially inert solvent; wherein in the above formulae, X is selected from the group consisting of nitro and chloro, R and R' are alkyl, with the proviso that R and R' may join to form a cycloalkyl group containing from 3 to 6 carbon atoms.

3. The method of producing nitro compounds having the formula:

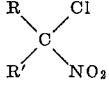

which comprises reacting ozone with a nitroso compound having the formula:

wherein in the above formulae, R and R' are alkyl with the proviso that R and R' may join to form a cycloalkyl group containing from 3 to 6 carbon atoms.

4. The method of producing nitro compounds having the formula:

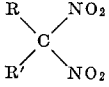

which comprises reacting ozone with a psuedonitrole compound of the formula:

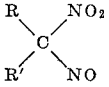

wherein in the above formulae, R and R' are alkyl with the proviso that R and R' may join to form a cycloalkyl group containing from 3 to 6 carbon atoms.

5. The method of producing nitro compounds having the formula:

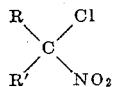

which comprises reacting ozone with a nitroso compound of the formula:

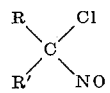

in the presence of a substantially inert solvent; wherein in the above formulae, R and R' are alkyl with the proviso that R and R' may join to form a cycloalkyl group containing from 3 to 6 carbon atoms.

6. The method of producing nitro compounds having the formula:

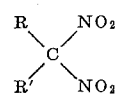

which comprises reacting ozone with a psuedo-nitrole compound having the formula:

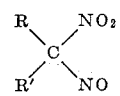

in the presence of a substantially inert solvent; wherein in the above formulae, R and R' are alkyl with the provisio that R and R' may join to form a cycloalkyl group consisting from 3 to 6 carbon atoms.

7. The method of preparing 2,2-dinitropropane which comprises reacting propyl pseudonitrole with ozone in the presence of glacial acetic acid.

8. The method of preparing 2-chloro-2-nitropropane which comprises reacting 2-chloro-2-nitrosopropane with ozone in the presence of glacial acetic acid.

9. The method of preparing 1,1-dinitrocyclohexane which comprises contacting cyclohexyl pseudonitrole with ozone in the presence of glacial acetic acid.

10. A method of producing nitro compounds of the formula

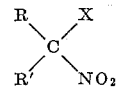

which comprises contacting ozone with a nitroso compound of the formula

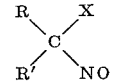

wherein in the above formulae, X is selected from the group consisting of nitro and chloro, R and R' are alkyl, with the proviso that R and R' may join to form a cycloalkyl group containing from 3 to 6 carbon atoms, the reaction being conducted in the presence of a substantially inert solvent at a temperature of from about 0° C. to about 75° C.

11. A method of producing nitro compounds of the formula

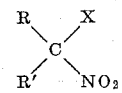

which comprises contacting ozone with a nitroso compound of the formula

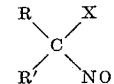

wherein in the above formulae, X is selected from the group consistign of nitro and chloro, R and R' are alkyl, with the proviso that R and R' may join to form a cycloalkyl group containing from 3 to 6 carbon atoms, the reaction being conducted in the presence of a glacial acetic acid at a temperature of from about 0° C. to about 75° C.

References Cited by the Examiner

Ungnade et al., J. Org. Chem., vol. 24, pp. 666–668, 1959.

LEON D. ROSDOL, *Primary Examiner.*

REUBEN EPSTEIN, *Examiner.*

L. A. SEBASTIAN, *Assistant Examiner.*